(12) United States Patent
Mak

(10) Patent No.: US 7,424,808 B2
(45) Date of Patent: Sep. 16, 2008

(54) CONFIGURATIONS AND METHODS OF ACID GAS REMOVAL

(75) Inventor: John Mak, Santa Ana, CA (US)

(73) Assignee: Fluor Technologies Corporation, Aliso Viejo, CA (US)

(*) Notice: Subject to any disclaimer, the term of this patent is extended or adjusted under 35 U.S.C. 154(b) by 368 days.

(21) Appl. No.: 10/526,817

(22) PCT Filed: Sep. 17, 2002

(86) PCT No.: PCT/US02/29810

§ 371 (c)(1),
(2), (4) Date: Dec. 16, 2005

(87) PCT Pub. No.: WO2004/026441

PCT Pub. Date: Apr. 1, 2004

(65) Prior Publication Data

US 2006/0110300 A1  May 25, 2006

(51) Int. Cl.
*F25J 3/00* (2006.01)
*B01D 47/00* (2006.01)
*B01D 53/14* (2006.01)

(52) U.S. Cl. .............................. 62/625; 62/632; 62/634; 96/234; 95/187; 95/235; 95/236; 423/220

(58) Field of Classification Search .................. 62/51.2, 62/625, 632, 634; 96/243, 234; 95/156, 95/187, 223, 235, 236; 423/220
See application file for complete search history.

(56) References Cited

U.S. PATENT DOCUMENTS

| | | | | | |
|---|---|---|---|---|---|
| 4,421,535 | A | * | 12/1983 | Mehra ......................... | 62/625 |
| 4,444,576 | A | * | 4/1984 | Ryan et al. .................... | 62/632 |
| 4,514,203 | A | * | 4/1985 | Gazzi et al. ................... | 62/625 |
| 4,599,096 | A | * | 7/1986 | Burr ............................ | 62/624 |
| 4,710,211 | A | * | 12/1987 | Gazzi et al. ................... | 62/634 |
| 4,743,282 | A | * | 5/1988 | Mehra ......................... | 62/625 |
| 4,747,858 | A | * | 5/1988 | Gottier ........................ | 62/632 |
| 4,971,607 | A | * | 11/1990 | Gazzi et al. ................... | 95/174 |
| 5,345,772 | A | * | 9/1994 | Hopewell ..................... | 62/632 |
| 6,553,784 | B2 | * | 4/2003 | Lu .............................. | 62/632 |
| 6,712,880 | B2 | * | 3/2004 | Foglietta et al. ............... | 95/184 |

* cited by examiner

*Primary Examiner*—William C Doerrler
(74) *Attorney, Agent, or Firm*—Fish & Associates, PC (57) ABSTRACT

A plant includes an absorber (105) that receives a feed gas (10) at a pressure of at least 400 psig and comprising at least 5 mol % carbon dioxide, wherein the absorber (105) is operated at an isothermal or decreasing top-to-bottom thermal gradient, and wherein the absorber (105) employs a physical solvent to at least partially remove an acid gas from the feed gas (10). Such configuration advantageously provide cooling (108) by expansion of the rich solvent (21) generated in the absorber (105), wherein both a semi-rich solvent (13) generated and recycled to the absorber (105) and the feed gas (10) are cooled by expansion of the rich solvent (21).

21 Claims, 4 Drawing Sheets

CONFIGURATIONS AND METHODS OF ACID GAS REMOVAL

FIELD OF THE INVENTION

The field of the invention is removal of acid gases from a feed gas, and particularly relates to acid gas removal from high carbon dioxide content feed gas.

BACKGROUND OF THE INVENTION

Acid gas removal from various gas streams, and especially removal of carbon dioxide from natural gas streams has become an increasingly important process as the acid gas content of various gas sources is relatively high, or increases over time. For example, there are relatively large natural gas resources (e.g., Alaska, Continental North America, Norway, Southeast Asia, or Gulf of Mexico) that contain high concentrations of carbon dioxide ranging from 20% to 75%. Moreover, where enhanced oil recovery (EOR) is employed, the carbon dioxide concentration in natural gas will increase over time to significant concentrations that will typically require gas processing to remove at least part of the carbon dioxide.

Currently more than half of the natural gas produced in the U.S. is treated to meet pipeline specification with minimal processing, and such processing frequently includes glycol dehydration and hydrocarbon removal. Untreated gas with high carbon dioxide content is usually left in the ground, mostly due to economical and/or technical considerations.

Among other difficulties, removal of impurities (primarily water, hydrogen sulfide, and/or carbon dioxide) is generally required to transport the treated natural gas through pipelines, which significantly increases production costs. Furthermore, many known acid gas removal processes also remove a portion of the methane and other hydrocarbons. (Losses of less than about 2% of hydrocarbons are normally acceptable, losses of 5-10% may be acceptable if the value of the product gas is high or offset by other advantages, while losses above 10% are normally unacceptable). Still further, the removed carbon dioxide must typically be recompressed back to the high pressure formation to reduce its environmental impact and for enhanced oil recovery, which is energy intensive and therefore economically unattractive.

To overcome at least some of the disadvantages associated with acid gas removal, numerous processes were developed and may be categorized into various categories, wherein the choice of the appropriate gas treatment will predominantly depend on the gas composition, the size and location of the plant, and other variables.

For example, in one category one or more membranes are used to physically separate the acid gas from a gaseous feed stream, wherein a typical membrane system includes a pretreatment skid and a series of membrane modules. Membrane systems are often highly adaptable to accommodate treatment of various gas volumes and product-gas specifications. Furthermore, membrane systems are relatively compact and are generally free of moving parts, therefore rendering membrane systems an especially viable option for offshore gas treatment. However, all or almost all single stage membrane separators are relatively non-selective and therefore produce a carbon dioxide permeate stream with a relatively high methane and hydrocarbon content (which is either vented, incinerated or used as a low BTU fuel gas). Consequently, the high methane and hydrocarbon losses tend to render the use of this process undesirable and uneconomical. To reduce such losses, multiple stages of membrane separators with interstage recompression may be used. However, such systems tend to be energy intensive and costly.

In another category, a chemical solvent is employed that reacts with the acid gas to form a (typically non-covalent) complex with the acid gas. In processes involving a chemical reaction between the acid gas and the solvent, the crude gases are typically scrubbed with an alkaline salt solution of a weak inorganic acid (e.g., U.S. Pat. No. 3,563,695 to Benson), or with an alkaline solution of organic acids or bases (e.g., U.S. Pat. No. 2,177,068 to Hutchinson). One particular advantage of a chemical solvent system is that such systems typically absorb methane to a relatively low degree. Furthermore, chemical solvent systems often produce a product gas with a very low acid gas content.

However, while use of chemical solvent systems may be advantageous in at least some respects (see above), substantial difficulties are frequently inherent. For example, once the chemical solvent is spent, the acid gas is flashed off and the solvent is regenerated using heat, which may add substantial cost to the acid gas removal. Furthermore, the mechanical equipment in a gas treatment plant using a chemical solvent is often prone to failure from either corrosion or foaming problems. Still further, chemical solvent systems typically include columns, heaters, air coolers, pumps, etc., all of which require frequent quality checks and maintenance, making operational reliability probably the weakest feature of such systems. Yet another disadvantage of chemical solvent systems is that the product gas and carbon dioxide streams must typically be further dried to meet pipeline specifications. Moreover, the quantity of chemical solvent required to absorb increasing amounts of acid gases generally increases proportionally with acid gas quantity, thus making the use of chemical solvents problematic where the acid gas content increases over time in the feed gas.

In a still further category, a physical solvent is employed for removal of acid gas from a feed gas, which is particularly advantageous for treating gas with a high acid gas partial pressure as the potential treating capacity of the physical solvent increases with the acid gas partial pressure (Henry's law). Using physical solvents, absorption of a particular acid gas predominantly depends upon the particular solvent employed, and is further dependent on pressure and temperature of the solvent. For example, methanol may be employed as a low-boiling organic physical solvent, as exemplified in U.S. Pat. No. 2,863,527 to Herbert et al. However, the refrigerant cooling requirement to maintain the solvent at cryogenic temperatures is relatively high, and the process often exhibits greater than desired methane and ethane absorption, thereby necessitating large energy input for recompression and recovery.

Alternatively, physical solvents may be operated at ambient or slightly below ambient temperatures, including propylene carbonates as described in U.S. Pat. No. 2,926,751 to Kohl et al., and those using N-methylpyrrolidone or glycol ethers as described in U.S. Pat. No. 3,505,784 to Hochgesand et al. In further known methods, physical solvents may also include ethers of polyglycols, and specifically dimethoxytetraethylene glycol as shown in U.S. Pat. No. 2,649,166 to Porter et al., or N-substituted morpholine as described in U.S. Pat. No. 3,773,896 to Preusser et al. While use of physical solvents avoids at least some of the problems associated with chemical solvents or membranes, various new difficulties arise. Among other things, most known solvent processes lack an efficient heat exchange integration configuration, and often require significant refrigeration and/or high solvent circulation, and sometimes require heat for solvent regeneration. In most or almost most of the known physical solvent processes, co-absorption of methane and hydrocarbons can be relatively high due to the high solvent circulation.

Figure 1:
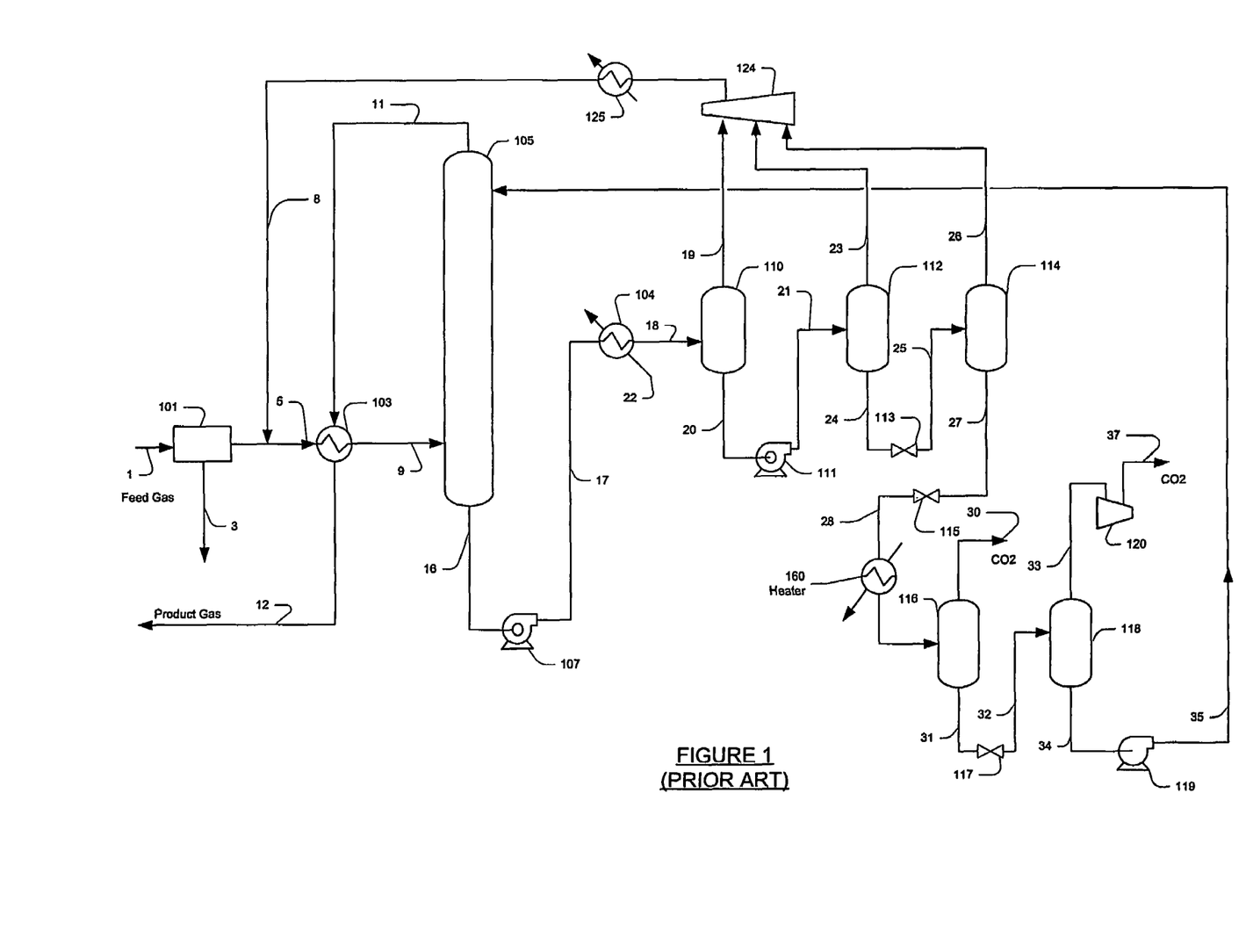
FIG. 1 is schematic depicting an exemplary known configuration for acid gas removal using a physical solvent.

Furthermore, where relatively low carbon dioxide content in the product gas is required, various physical solvent processes require steam or external heat for solvent regeneration. A typical physical solvent process is exemplified in Prior Art FIG. 1, which is conceptually relatively simple and employs use of a cold lean solvent to remove carbon dioxide from the feed gas. The solvent is regenerated by successive flashing to lower pressures and the flashed solvent is then pumped to the absorber, wherein the solvent is cooled using external refrigeration (either in the rich solvent or the lean solvent circuit). In most instances, a steam or fuel fired heater is required for solvent regeneration.

In such processes, as carbon dioxide is absorbed by the solvent, the heat of solution of carbon dioxide increases the solvent temperature resulting in a top-to-bottom increasing temperature profile across the absorber. Consequently, one limitation of physical absorption lies in the relatively high absorber bottom temperature, which limits carbon dioxide absorption capacity of the solvent. To overcome the problems associated with limited absorption capacity, the solvent circulation rate may be increased. However, increase in solvent circulation significantly increases refrigeration costs and energy consumption for pumping the solvent. Worse yet, high solvent circulation of known solvent processes will lead to increased loss of methane and hydrocarbons (due to co-absorption). Yet another undesirable aspect of known physical solvent processes is problematic heat and mass transfer due to the cold lean solvent temperature entering the top of the absorber: While a relatively cold lean solvent is required to reduce solvent circulation in known processes, further reduction of the lean solvent temperature becomes undesirable as the solvent's surface tension and viscosity increase, eventually leading to hydraulic problems.

Moreover, in all or almost all of the known acid gas removal processes using solvents the acid gas is removed in the regenerator at low or substantially atmospheric pressure. Consequently, and especially where the carbon dioxide is later used for EOR, the isolated carbon dioxide must be compressed to substantial pressures, which further increases process costs. Thus, although various configurations and methods are known to remove acid gases from a feed gas, all or almost all of them suffer from one or more disadvantages. Therefore, there is still a need to provide methods and configurations for improved acid gas removal.

SUMMARY OF THE INVENTION

The present invention is directed towards methods and configurations of a plant comprising an absorber that receives a feed gas at a pressure of at least 400 psig with at least 5 mol % carbon dioxide, wherein the absorber is operated at an isothermal or decreasing top-to-bottom thermal gradient, and wherein the absorber employs a physical solvent to at least partially remove an acid gas from the feed gas.

The absorber in preferred plants produces a semi-rich solvent and a rich solvent, and wherein the semi-rich solvent is cooled by at least partially expanded rich solvent. It is further contemplated that preferred absorbers produce a rich solvent that is expanded in at least two steps, wherein expansion in one step produces work, and wherein expansion in another step provides refrigeration for at least one of a semi-rich solvent produced by the absorber and a carbon dioxide product. In further aspects of preferred absorbers, the absorber produces a rich solvent that is expanded in at least three steps, wherein expansion in the at least three steps produces at least three recycle streams, respectively, and wherein the at least three recycle streams (which may further be compressed to form a compressed recycle stream, and wherein further refrigeration may be provided by Joule-Thomson cooling of compressed recycle stream) are fed into the absorber. It is further contemplated that the absorber is operated at a bottom temperature of about −25° F. to about 45° F. and produces a rich solvent that is expanded to provide refrigeration for a carbon dioxide product.

Therefore, contemplated absorbers may receive a natural gas comprising at least 5 mol % acid gas and having a pressure of at least 400 psig and include a physical solvent that absorbs at least a portion of the acid gas in the absorber to form a semi-rich solvent, wherein a cooler is fluidly coupled to the absorber that receives and cools the semi-rich solvent and provides the cooled semi-rich solvent back to the absorber, wherein the cooled semi-rich solvent further absorbs at least another portion of the acid gas to form a rich solvent, and wherein the natural gas and the semi-rich solvent are cooled at least in part by expansion of the rich solvent.

Various objects, features, aspects and advantages of the present invention will become more apparent from the following detailed description of preferred embodiments of the invention, along with the accompanying drawing.

BRIEF DESCRIPTION OF THE DRAWING

Prior art

DETAILED DESCRIPTION

The inventors have discovered that acid gases, and particularly carbon dioxide, may be removed from a feed gas comprising at least 5 mol % carbon dioxide using configurations and methods in which an absorber receives a feed gas at a pressure of at least 400 psig, wherein the absorber is operated at an isothermal or decreasing top-to-bottom thermal gradient, and wherein the absorber employs a physical solvent to at least partially remove an acid gas from the feed gas.

As used herein, the term "isothermal gradient" means that the temperature of the physical solvent in an upper portion of the absorber is substantially identical (i.e., absolute deviation of temperature no more than 10° F.) with the temperature of the physical solvent in a middle and lower portion of the absorber. Similarly, the term "decreasing top-to-bottom thermal gradient" as used herein means that the temperature of the physical solvent in an upper portion of the absorber is higher than the temperature of the physical solvent in a middle and/or lower portion of the absorber.

As further used herein, and with respect to a column or absorber, the terms "upper" and "lower" should be understood as relative to each other. For example, withdrawal or addition of a stream from an "upper" portion of a column or absorber means that the withdrawal or addition is at a higher position (relative to the ground when the column or absorber is in operation) than a stream withdrawn from a "lower" region thereof. Viewed from another perspective, the term "upper" may thus refer to the upper half of a column or absorber, whereas the term "lower" may refer to the lower half of a column or absorber. Similarly, where the term "middle" is used, it is to be understood that a "middle" portion of the column or absorber is intermediate to an "upper" portion and a "lower" portion. However, where "upper", "middle", and "lower" are used to refer to a column or absorber, it should not be understood that such column is strictly divided into thirds by these terms.

As still further used herein, the term "about" when used in conjunction with numeric values refers to an absolute deviation of less or equal than 10% of the numeric value, unless otherwise stated. Therefore, for example, the term "about 10 mol %" includes a range from 9 mol % (inclusive) to 11 mol % (inclusive).

Figure 2:
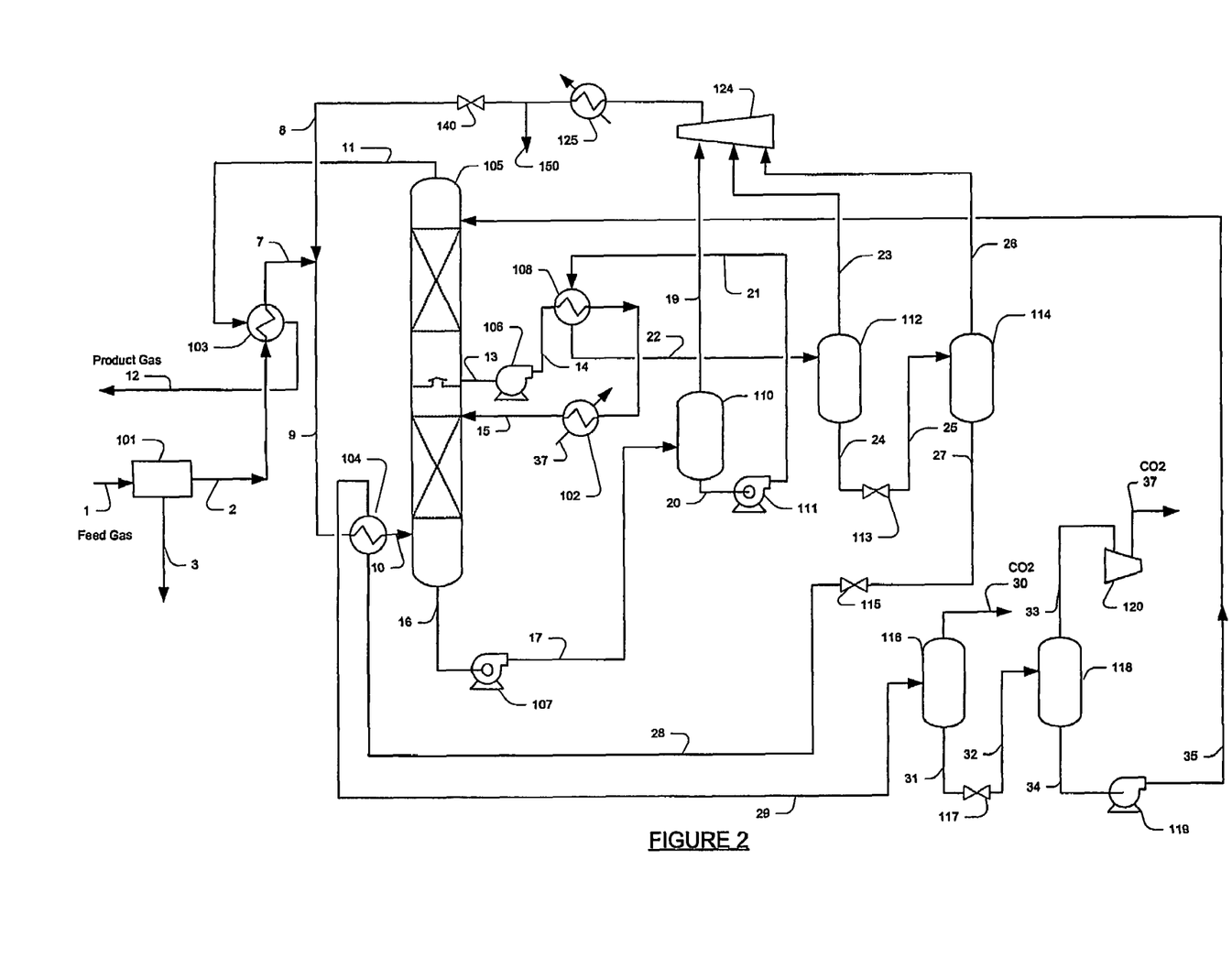
FIG. 2 is one exemplary schematic depicting a plant configuration for acid gas removal according to the inventive subject matter.

In a preferred configuration as depicted in FIG. 2, an exemplary plant comprises a gas pretreatment unit 101 that may include (1) one or more gas coolers for removing the bulk of the water content by cooling the gas to just above the gas hydrate temperature typically at 60° F.; (2) heavy hydrocarbon removal units for $C_6+$ components in a feed gas; (3) a gas dehydration unit, preferably a molecular sieve unit or a glycol unit (Drizo) to produce a very low water dew-point feed gas. Water and heavy hydrocarbons are removed in the pretreatment unit 101 from the feed gas stream 1 as water and heavy hydrocarbon stream 3 to form treated feed gas stream 2.

It is particularly preferred that treated feed gas stream 2 is further cooled to typically 10° F. to 40° F. in a heat exchanger 103 using absorber overhead stream 11 as a refrigerant to form cooled treated feed gas stream 7, which is mixed with combined recycle stream 8 to form stream 9 that is further cooled in heat exchanger 104. In this configuration, heat exchanger 104 uses refrigeration provided by atmospheric depressurized rich solvent stream 28 and further cools stream 9 to typically −15° F. to −45° F. thereby forming cooled stream 10. The so cooled stream 10 enters the absorber 105 at a lower portion of the absorber. It should be particularly appreciated that cooling of the treated feed gas stream to a relatively low temperature (e.g., about −15° F. to about −45° F.) will maintain the absorber bottom temperature at a particularly low level (e.g., about 0° F. to about −40° F.), which is used to maximize the carbon dioxide loading of the rich solvent, and thereby to minimize solvent circulation and methane and hydrocarbons losses.

It is further preferred that a side cooler 108 is employed to control and/or maintain the temperature of the lower section of the absorber 105 at a predetermined absorption temperature. In such configurations, the semi-rich solvent stream 13 (generated by absorption of acid gas in an upper portion of the absorber) is pumped by the side cooler pump 106 (stream 14) and is cooled in heat exchanger 108 using flashed rich solvent stream 21 from hydraulic turbine 111 as refrigerant. The so cooled semi-lean solvent stream 15, at typically −10° F. to −40° F., is returned to the lower section of the absorber 105.

It is especially preferred that the refrigerant for the side cooler 108 is provided by the flashed rich solvent stream 21 (depressurized rich solvent stream) from hydraulic turbine 111. However, it should be recognized that cooling may also be provided by various other refrigerant, and suitable refrigerants may be internal (produced within the plant) or external. For example, the refrigerant for side cooler 108 may also be provided by flashing of carbon dioxide and/or via an expansion turbine. Alternatively, refrigeration may be provided and/or supplemented by JT cooling created from the recycle gas cooler 125 and JT 140, or by an external source at exchanger 102 with an external refrigerant 37, particularly when the feed gas pressure is low.

It should be especially appreciated that when a heavier gas is processed, a hydrocarbon liquid stream 150 is formed at the discharge of the recycle gas cooler 125. Recovery of such liquid products will add to the economical benefit of this process while reducing the gas recycle.

Thus, suitable side coolers may be advantageously configured to maintain an optimum absorption temperature for effective absorption of the acid gas. Consequently, it should be recognized that in such configurations the middle portion of the absorber is preferably operated at a lower temperature than the upper portion of the absorber, which is particularly advantageous when the solvent is loaded with carbon dioxide (the solvent will typically exhibit lower viscosity and lower surface tension).

The semi-rich solvent will then in the absorber further absorb carbon dioxide from the feed gas, thereby forming rich solvent 16 that exits the absorber via first hydraulic turbine 107.

First hydraulic turbine 107 reduces the absorber bottoms pressure to typically about half of the feed gas pressure, thus cooling the rich solvent to about −5° F. to −35° F. to form a depressurized rich solvent stream 17. It is generally contemplated that the hydraulic turbine is an energy efficient device as it generates refrigeration cooling by expansion and flashing of the carbon dioxide content while providing shaft work to drive the solvent circulation pump.

The rich solvent 17 is flashed to separator 110 which produces a first flashed hydrocarbon vapor (first hydrocarbon recycle stream 19) that is recovered to the absorber 105 via recycle compressor 124 and stream 8. The so flashed solvent stream 20 is further expanded in a second hydraulic turbine 111 to a pressure reduced by half to form an expanded rich solvent stream 21 (typically at −20° F. to −40° F.), which is used to cool the semi-rich solvent stream 14 in heat exchanger 108. The heated rich solvent 22 from heat exchanger 108, typically at 10° F. to −10° F., is separated in separator 112, which produces a second flashed hydrocarbon vapor (second hydrocarbon recycle stream 23) to be recycled via recycle compressor 124. The flashed liquid stream 24 from separator 112 is further let down in pressure in an expansion JT valve 113 to reduce pressure typically by half, thereby chilling the rich solvent to 5° F. to −15° F. The so flashed solvent 25 is separated in separator 114 which produces a third flashed hydrocarbon vapor (third hydrocarbon recycle stream 26) to be recycled via recycle compressor 124. The power generated from the first and second hydraulic turbines 107 and 111 can be used to provide part of the power requirement of the lean solvent pump 119, vacuum pump 120, recycle compressor 124 or for power generation.

The flashed liquid 27 from separator 114 is let down in pressure in an expansion JT valve 115 to above atmospheric pressure, thereby further chilling the rich solvent to −20° F. to −45° that is then used for chilling the feed gas in heat exchanger 104. The heated rich solvent 29 from heat exchanger 104, typically at 0° F. to −40° F., is then separated in separator 116 at atmospheric pressure to produce a flashed carbon dioxide stream 30 that can vented or used for enhanced oil recovery. To further enhance solvent regeneration efficiency, the atmospheric flashed solvent 31 is expanded via JT valve 117 to vacuum pressures (typically 1 to 10 psia) in stream 32, which is separated in vacuum separator 118 to form an ultra lean solvent stream 34 and a flashed carbon dioxide vapor stream 33. The ultra lean solvent 34 is pumped by lean solvent pump 119 to the absorber pressure for carbon dioxide absorption and delivered via compressed ultra lean solvent stream 35. The carbon dioxide may then be compressed via vacuum pump 120 to form compressed carbon dioxide stream 37.

Figure 3:
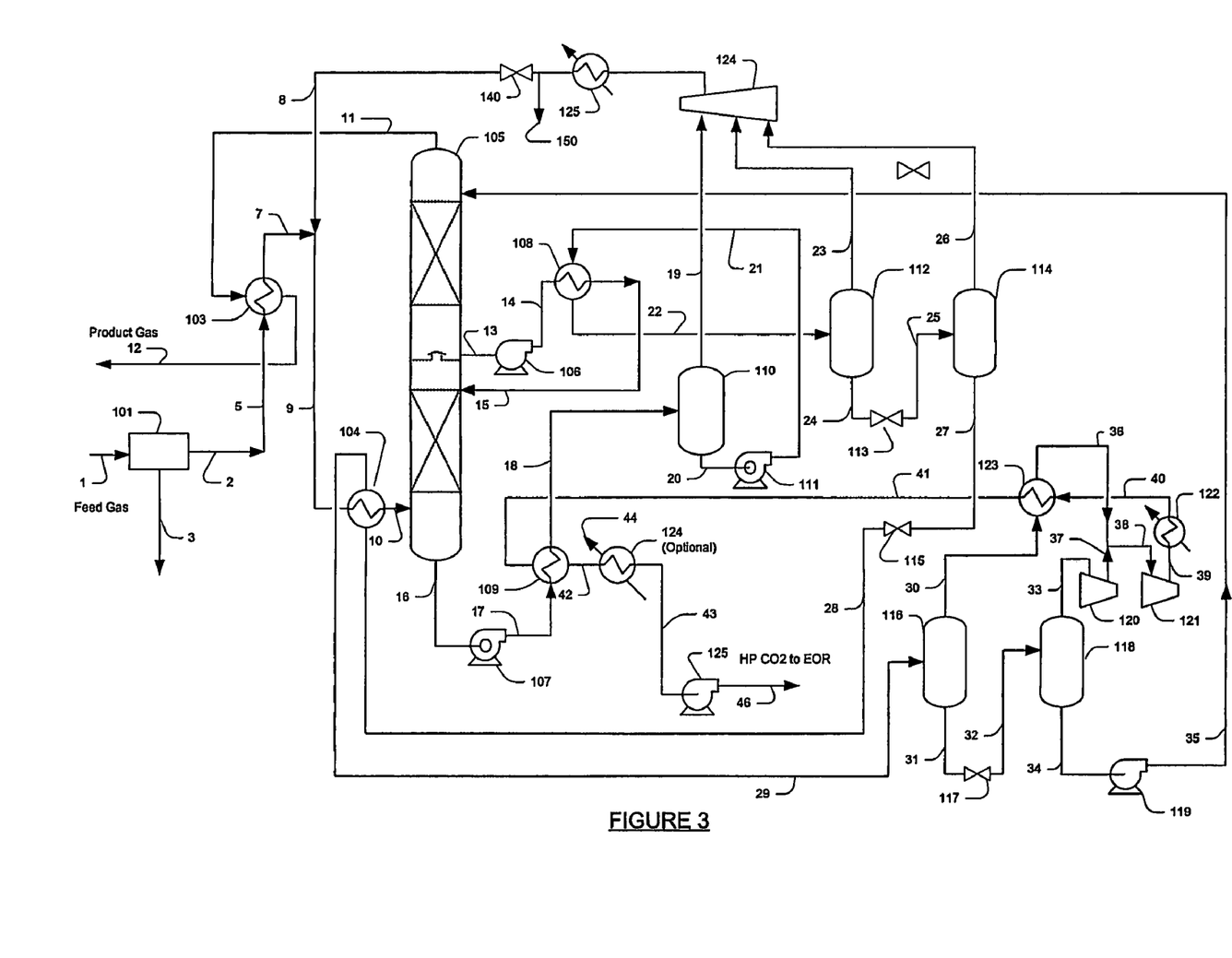
FIG. 3 is another exemplary schematic depicting a plant configuration for acid gas removal for EOR with additional carbon dioxide liquid production using internally produced refrigeration.

It should be particularly appreciated that the so generated carbon dioxide streams will contain over 95 mol % $CO_2$, which are suitable for enhanced oil recovery. If necessary, higher purity carbon dioxide stream can be produced by increasing the temperatures and/or reducing the pressures of the flash separators. The product gas, to meet pipeline carbon dioxide specification, contains typically 2% $CO_2$, which can further be reduced with the use of an ultra lean solvent formed by further reducing the vacuum pressure of the vacuum separator and with the use of a stripping gas (via vacuum stripping).

Where enhanced oil recovery is particularly desirable, it is contemplated that configurations according to the inventive subject matter may be modified as depicted in FIG. 3, in which like numerals depict like components as shown in FIG. 2. In plant configurations according to FIG. 3, an additional heat exchanger 109 is employed to cool the carbon dioxide stream 41 using the depressurized rich solvent stream 17 from the hydraulic turbine 107. In addition, the flashed carbon dioxide vapor 33 is compressed in a vacuum pump 120 to atmospheric pressure, combined with stream 36 to form stream 38, and still further compressed in compressor 121. The compressed carbon dioxide stream 39 is cooled to its liquid state (in stream 43) successively by heat exchangers 122, 123, and 109. An optional trim condenser 124 with external refrigeration (44) may be required to supplement refrigeration duty required by carbon dioxide condensation. Carbon dioxide liquid 43 is pumped by pump 125 to stream 46 for re-injection for enhanced oil recovery, typically at 4000 psig.

Figure 4:
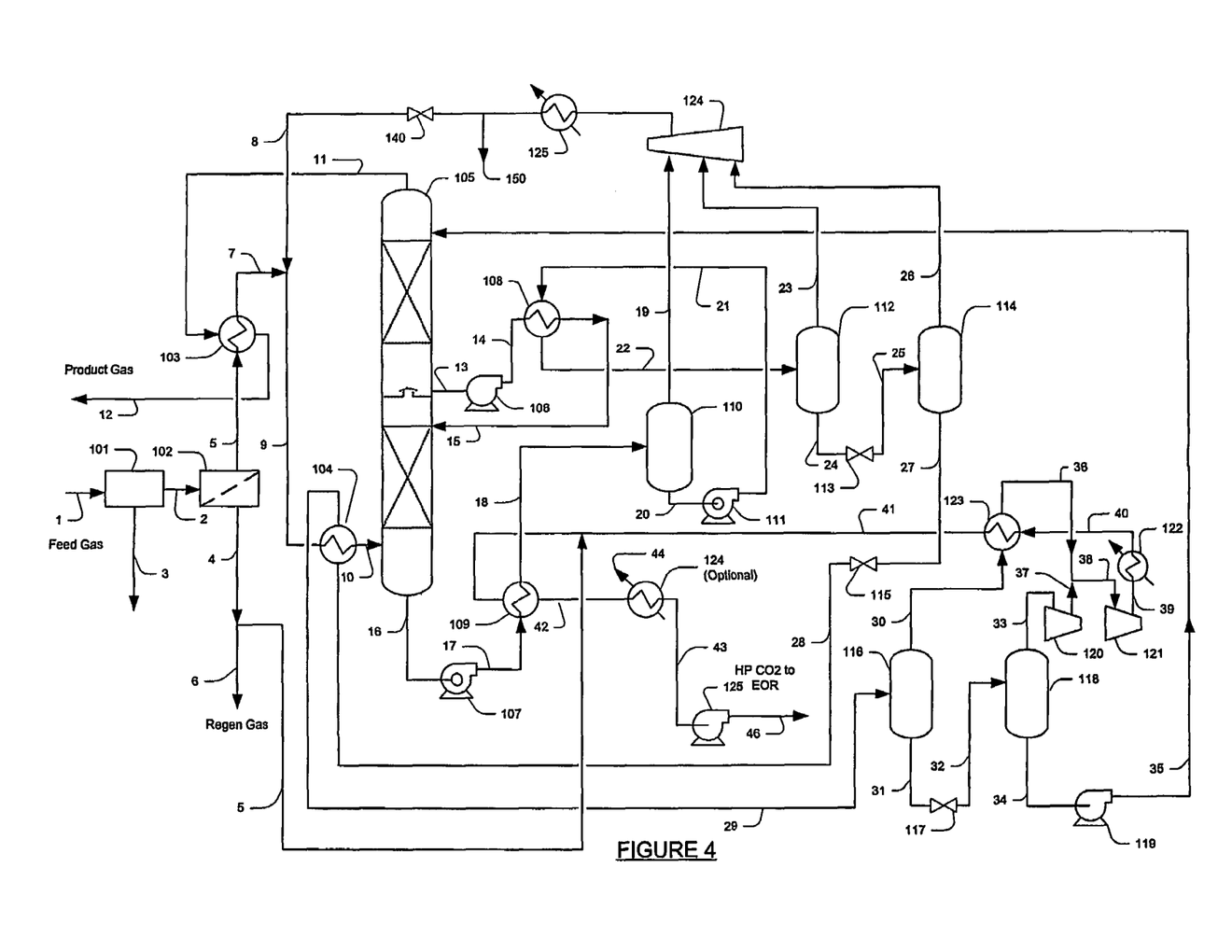
FIG. 4 is a further exemplary schematic depicting a plant configuration for acid gas removal for EOR configured with additional membrane separation upstream and carbon dioxide liquid production using internally produced refrigeration.

Alternatively, and especially where the feed gas pressure is relatively high (e.g., above 1000 psig), an upstream membrane separation unit may be employed as depicted in FIG. 4, in which like numerals depict like components as shown in FIG. 3. In such configurations, it is especially preferred that one or more membrane separators 102 perform as a bulk carbon dioxide removal unit producing a non-permeate stream 5 with carbon dioxide content typically 30% to 50% at a high pressure, and a permeate stream 4 with carbon dioxide content typically at 60% to 95% and at a permeate pressure that can be combined with the other carbon dioxide stream for enhanced oil recovery. Of course, it should be recognized that a particular carbon dioxide concentration will at least in part depend on the particular membrane separator used, and further on the solvent unit and treating specifications of the product gas and the carbon dioxide stream. Alternatively, or additionally, a portion of the permeate stream may also be suitable for use as regeneration gas or stripping gas for the dehydration unit.

Thus, it should be especially recognized that the carbon dioxide content in the feed gas will provide refrigeration for solvent chilling as well as liquefaction duty of the carbon dioxide stream by the expansion of the rich solvent with hydraulic turbines and JT valves. It should further be appreciated that if additional refrigeration is required (e.g., at relatively low feed pressure), solvent cooling can be supplied by JT cooling with the recycle gas compressor 124 compressing to a higher pressure, cooled in heat exchanger 125 and letdown using JT valve 140 to the absorber pressure.

With respect to suitable feed gases, it is contemplated that numerous natural and synthetic feed gases are appropriate. However, particularly preferred feed gases include natural gas, and especially natural gas with a carbon dioxide that is at least about 5 mol %, more typically at least 10 about mol %, and most typically at least 10 to 75 mol %. Therefore, especially suitable feed streams include natural gas feed streams from oil and gas fields such as Alaska, Norway, Southeast Asia and Gulf of Mexico. Similarly, the acid gas content (and especially carbon dioxide content) of suitable feed gases may vary and will predominantly depend on the source of the feed gas. It is generally preferred, however, that the acid gas content will be at least about 5 mol %, more typically at least 10 about mol %, and most typically at least 20 to 75 mol %. A typical feed gas composition is given in Table 1 below:

TABLE 1

| COMPONENT | MOL % |
|---|---|
| $N_2$ | 0.88 |
| $CO_2$ | 19.14 |
| $H_2S$ | 0.00 |
| $C_1$ | 72.69 |
| $C_2$ | 5.29 |
| $C_3$ | 1.40 |
| $IC_4$ | 0.22 |
| $NC_4$ | 0.26 |
| $IC_5$ | 0.02 |
| $NC_5$ | 0.01 |
| $C_6$ | 0.08 |

Furthermore, it should be recognized that the pressure of contemplated feed gases may vary considerably, and suitable pressures will range between atmospheric pressure and several thousand psig. However, it is particularly preferred that the feed gas has a pressure of at least 400 psig, more typically at least 1000 psig, even more typically at least 3000 psig, and most typically at least 5000 psig. Moreover, while it is generally contemplated that at least a portion of the feed gas pressure is due to the pressure of the gas contained in the well, it should also be recognized that where appropriate, the pressure may also be increased using one or more compressors.

In yet further aspects of the inventive subject matter, contemplated fed gases are preferably cooled before entering the absorber, and it is especially preferred that the cooling of the feed gas will be at least in part effected by the product gas (i.e., the absorber overhead stream) in one or more heat exchangers. With respect to the degree of cooling, it is generally contemplated that the feed gas may be cooled to various temperatures. However, it is especially preferred that the feed stream will be cooled to a temperature just above the gas hydrate point. The cooled feed gas stream may then be fed into a separator in which at least a portion of the water contained in the feed gas is removed from the cooled feed stream to form a partially dehydrated feed gas.

The so formed partially dehydrated feed gas may then be further treated to remove higher hydrocarbons (e.g., $C_6^+$) and then still further dehydrated in a dehydration unit (all known gas dehydration units are suitable for use). For example, further dehydration may be performed using glycol or molecular sieves. Dehydration of the feed is particularly advantageous because the absorption process can be run at significantly lower temperature. Moreover, the product gas and the carbon dioxide are produced in a very dry state that eliminates any downstream dehydration of the product gases.

In still further preferred aspects, and especially where the feed gas pressure and/or carbon dioxide content is relatively high, it is contemplated that the dehydrated feed gas may be further separated in membrane separators to produce a carbon dioxide rich permeate that can be used for enhance oil recovery or regeneration gas of the dehydration unit and a non-permeate for downstream solvent absorption. However, the use of the membrane separators may not be required when carbon dioxide content in the feed gas is less than 50%, most typically at least 10% to 45%. In especially preferred contemplated configurations using membrane separators, the dried non-permeate is cooled in a first heat exchanger, wherein the cooling duty is provided by the product gas (i.e., the absorber overhead stream), and in a second heat exchanger, wherein the cooling is further provided by the expanded rich solvent. Membrane separation technology is attractive for this separation, because treatment can be accomplished using the high wellhead gas pressure as the driving force for the separation. Conventional membrane separators such as the cellulose acetate membranes can provide adequate selectivity for carbon dioxide removal with minimal methane loss in the permeate stream.

Therefore, it should be particularly recognized that suitable absorbers will operate at relatively high pressure, and especially contemplated high pressures are at least 500 psi, typically at least 1000 psi, even more typically at least 3000 psi, and most typically at least 5000 psi. Consequently, it should be recognized that contemplated absorbers may operate in a gas phase supercritical region. The term "operate in a gas phase supercritical region" as used herein refers to operation of the absorber under conditions in which at least a portion of the feed gas, if not all of the feed gas, will be in a supercritical state. Furthermore, by operating the absorption process in the gas phase supercritical region, hydrocarbon condensation is typically avoided, which currently presents a significant problem in heretofore known processes. In yet further contemplated aspects, the type of absorber need not be limited to a particular configuration, and all known absorber configurations are deemed suitable for use herein. However, particularly preferred contacting devices include a packed bed or tray configurations.

With respect to the solvent employed in contemplated absorbers, it should be recognized that all physical solvents and mixtures thereof are appropriate. There are numerous physical solvents known in the art, and exemplary preferred physical solvents include propylene carbonate, tributyl phosphate, normal methylpyrrolidone, dimethyl ether of polyethylene glycol, and/or various polyethylene glycol dialkyl ethers. Alternatively, other solvents including enhanced tertiary amine (e.g., piperazine) having similar behavior as physical solvent may be employed.

Consequently, the absorber will provide a product gas that is depleted of acid gases, and particularly depleted of carbon dioxide. Moreover, it should be recognized that since the absorber receives a cooled and dehydrated feed gas, the product gas would typically conform to all or almost all sales gas specifications and requirements for transportation through high-pressure pipelines. It should further be especially appreciated that the rich solvent formed in the absorber may leave the absorber bottom at relatively high pressure (e.g., at least 500 psi, more typically between 1000 and 3000 psi), and may thus be utilized to provide work (e.g., for generation of electrical energy) and/or cooling of various streams in the separation process.

In especially preferred configurations, the rich solvent is let down in pressure using a first hydraulic turbine to generate mechanical or electric energy, and the depressurized rich solvent is then separated in a separator into a hydrocarbon-containing first recycle stream and a first rich solvent, which is subsequently (optionally) employed as a coolant to refrigerate a carbon dioxide stream for the enhanced oil recovery application (wherein the carbon dioxide is produced from the feed gas). The hydrocarbon-containing first recycle stream is preferably recycled to the absorber, while the first rich solvent is further depressurized using a second hydraulic turbine to further generate mechanical or electric energy. The so further depressurized rich solvent stream is then employed as a refrigerant in a heat exchanger (preferably a side cooler of the absorber) that cools the semi-rich solvent in the absorber to maintain a desirable absorber temperature. After passing through the heat exchanger, the further depressurized rich solvent stream is then separated in a second separator into a second rich solvent and a second hydrocarbon-containing recycle stream that is recycled to the absorber. From the second separator, the rich solvent stream is further depressurized by a JT valve and then separated in a third separator into a third rich solvent and a third hydrocarbon-containing recycle stream that is recycled to the absorber. The third depressurized rich solvent is then further depressurized to atmospheric pressure, generating refrigeration that is to be used to cool the feed gas, maintaining the absorber at a desirable low bottom temperature.

With the refrigeration provided by depressurizing the rich solvent, supplemental refrigeration is not required in most cases (particularly in high feed pressure operation). If extra refrigeration is required, it may be obtained internally by JT cooling created from the recycle gas cooler and JT valve, or from an external source in an exchanger with a refrigerant. Furthermore, the particular heat exchanger sequence may vary depending on the feed gas, solvent circulation and the carbon dioxide liquefaction duty requirements. For example, the first depressurized rich solvent may be used to chill the feed gas instead of the carbon dioxide stream, and the second depressurized rich solvent may be used for condensation of the carbon dioxide stream instead of the side cooler, and the third depressurized rich solvent cooler may be used for the side cooler instead of cooling the feed gas. Consequently, in preferred configurations a lean solvent is formed at higher temperatures with desirable thermal physical properties that enhance the hydrodynamic performance of the absorption process, and a rich solvent at the lowest possible temperature that maximizes carbon dioxide holding capacity of the solvent. Therefore, contemplated processes will result in lower solvent circulation, lower methane and hydrocarbons losses, and lower energy consumption than currently known solvent based acid gas removal processes.

Flashing of the rich solvent may be performed in various configurations, and it is generally contemplated that all known configurations are suitable for use herein. However, it is typically preferred that the rich solvent (after providing work and/or cooling) is further let down in pressure to a pressure sufficient to release at least 80% (more typically at least 90%, and most typically at least 95%) of the dissolved carbon dioxide. The so produced carbon dioxide is then separated in a separator (typically operating at atmospheric and sub-atmospheric pressure) from the lean solvent. It should be especially appreciated that the so generated carbon dioxide stream has a carbon dioxide content of over 90%, and more typically of at least 95%. Thus, the so formed carbon dioxide stream is especially suited to be employed in enhanced oil recovery process.

In still further contemplated aspects of the inventive subject matter, the lean solvent from the separator is further let down in pressure via JT valve and fed into a vacuum separator. Preferred vacuum separators operate at a pressure of between about 1 to 10 psia, which may be generated by a liquid seal vacuum pump. Residual carbon dioxide (typically with a purity of at least 95%) from the lean solvent is removed in the vacuum separator and may also be employed in enhanced oil recovery as depicted in FIGS. 3 and 4. The physical solvent is then regenerated under the deep vacuum condition that may be assisted by stripping gas and recirculated to the absorber via a lean solvent pump. In particularly preferred configurations, the vacuum separator may use a lean gas (e.g., a portion of the product gas) as a stripping gas to produce an ultra lean solvent. However, in alternative configurations, various gases other than the product gas are also suitable, including gases from other streams within the plant and even nitrogen or air. It should be further appreciated that the use of a vacuum separator in combination with a gas stripper in such configurations produces a very lean solvent capable of producing a treated gas with a $CO_2$ concentration of typically less than 1000 ppmv.

Thus, contemplated configurations will provide pipeline quality gas at high pressure and a carbon dioxide liquid stream, which can be used for enhanced oil recovery, wherein refrigeration is generated from successive depressurization of rich solvents. In especially preferred configurations, contemplated acid gas removal plants may operate without external refrigeration, and at higher pressure, such configurations will produce refrigeration that can be used to condense carbon dioxide for further use in enhanced oil recovery. Besides providing refrigerant for removing the heat of absorption from the absorber, the successive depressurization will return the flash vapors containing methane and hydrocarbons to the absorber which are substantially fully recovered during the recycle process. Moreover, product gas from the absorber and depressurized solvent at atmospheric pressure are employed to cool feed gas to the absorber maintaining the absorber bottom in a desirable low temperature range. It is therefore contemplated that the heat exchange configuration produces an absorber temperature profile with either very close to isothermal or with a decreasing temperature profile, resulting in favorable physical properties that improve the column hydrodynamic performance and absorption efficiency.

In particularly preferred configurations and where the feed gas comprises natural gas, it should be appreciated that the product gas comprises at least 90%, more typically at least 95%, and most typically at least 99% of the natural gas present in the feed gas. While not wishing to be bound be any theory or hypothesis, it is contemplated that such relatively high natural gas recovery in the product gas is achieved by providing at least one, and more preferably three hydrocarbon-containing recycle streams back to the absorber, and/or by operating the absorber under isothermal or a decreasing top-to-bottom thermal gradient. Suitable recycle gas compressors are all compressors that are capable of compressing the first and second hydrocarbon-containing recycle gas streams to a pressure equal or about the pressure of the cooled and dehydrated feed gas. Similarly, it is contemplated that the lean solvent pump will provide solvent pressure suitable for introduction of the lean solvent into the absorber.

Consequently, it is contemplated that configurations according to the inventive subject matter will significantly reduce overall energy consumption and capital cost as compared to conventional carbon dioxide removal processes at high carbon dioxide partial pressure using amine or other physical solvents or membranes. Moreover, contemplated configurations and processes will generally not require an external heat source or refrigeration, thereby further reducing energy consumption. Still further, enhanced oil recovery projects will frequently encounter an increase in carbon dioxide concentration in the feed gas, typically from 10% up to as high as 60%. Contemplated configurations and processes can accommodate these changes with essentially same solvent circulation.

A further advantage of contemplated configurations is that the process is generally a non-corrosive process due to operation at low temperature and lack of water in the physical solvent. In contrast, conventional amine units for carbon dioxide removal are generally more complex to operate and maintain as such processes tend to be corrosive and often require antifoam and anti-corrosion injections during operation. Still further, another advantage of contemplated physical solvent processes is that, unlike amine processes, the solvent circulation rate is less sensitive to increases in carbon dioxide partial pressure as the carbon dioxide loading in the rich solvent merely increases with increasing carbon dioxide concentration in the feed gas. In an amine unit design, the amine circulation rate would need to be increased linearly with increasing carbon dioxide content.

Yet another advantage of contemplated physical solvent processes is their simplicity and resistance to freezing compared to known amine treating processes, thus requiring less supporting offsites and utility systems, such as steam boilers. For example, contemplated configurations operating a high carbon dioxide feed gas may not require any cooling duty as the flashing of carbon dioxide from the rich solvent will provide the necessary cooling and regeneration. The inventors further contemplate that operation of a plant with vacuum regeneration can achieve a very low residual $CO_2$ content.

Thus, specific embodiments and applications for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended contemplated claims. Moreover, in interpreting both the specification and the contemplated claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of removing an acid gas from a feed gas comprising:
   feeding into an absorber the feed gas at a pressure of at least 400 psig, wherein the feed gas comprises at least 5 mol % carbon dioxide, wherein the absorber is operated at an isothermal or decreasing top-to-bottom thermal gradient,
   wherein the absorber employs a physical solvent to at least partially remove an acid gas from the feed gas to thereby produce an absorber overhead product, a semi-rich solvent, and a rich solvent;
   cooling the semi-rich solvent using refrigeration content of at least partially expanded rich solvent; and
   cooling the feed gas using refrigeration content of the at least partially expanded rich solvent and the absorber overhead product.

2. The method of claim 1 wherein the rich solvent is expanded in at least two steps, wherein expansion in one step produces work, and wherein expansion in another step provides refrigeration for the semi-rich solvent and optionally a carbon dioxide product.

3. The method of claim 1 wherein the rich solvent is expanded in at least three steps, wherein expansion in the at least three steps produces at least three recycle streams, respectively, and wherein the at least three recycle streams are fed into the absorber.

4. The method of claim 3 wherein the at least three recycle streams are compressed to form a compressed recycle stream, and wherein further refrigeration is provided by Joule-Thomson cooling of compressed recycle stream.

5. The method of claim 1 wherein the feed gas is cooled by the at least partially expanded rich solvent.

6. The method of claim 5 wherein the feed gas is further cooled by the absorber overhead product.

7. The method of claim 1 wherein at least part of the acid gas is removed from the physical solvent at a pressure of between about 1 psia to 10 psia.

8. The method of claim 1 wherein the feed gas has a pressure between about 400 psig to about 3000 psig, and wherein the feed gas is at least partially dehydrated.

9. The method of claim 1 wherein the feed gas has an acid gas content of between about 10 mol % to about 75 mol %.

10. The method of claim 1 wherein the feed gas comprises natural gas.

11. The method of claim 1 wherein the absorber is operated at a bottom temperature of about −25° F. to about −45° F.

12. The method of claim 1 wherein the rich solvent is expanded to provide refrigeration for a carbon dioxide product.

13. The method of claim 1 wherein the feed gas has a pressure of at least 1000 psig, and wherein at least a portion of the acid gas in the feed gas is removed from the feed gas using a membrane separator.

14. A plant comprising:
a gas source that is configured to provide natural gas comprising at least 5 mol % acid gas at a pressure of at least 400 psig;
an absorber fluidly coupled to the gas source and configured to receive the natural gas and further configured to form a semi-rich solvent from a physical solvent;
a cooler fluidly coupled to the absorber and configured to cool the semi-rich solvent and to provide the cooled semi-rich solvent back to the absorber at a temperature suitable to absorb at least another portion of the acid gas to thereby allow formation of a rich solvent in the absorber;
first and second expansion devices fluidly coupled to the absorber and further fluidly coupled to respective first and second heat exchangers, wherein the first and second expansion devices and heat exchangers are configured to allow cooling of the the natural gas and the semi-rich solvent in the first and second heat exchangers, respectively, by expansion of the rich solvent; and
wherein the first and second expansion devices and heat exchangers are further configured to allow operation of the absorber with an isothermal or decreasing top-to-bottom thermal gradient.

15. The plant of claim 14 wherein the first and second heat exchangers are configured such that cooling of the natural gas and the semi-rich solvent provides an isothermal or decreasing top-to-bottom thermal gradient in the absorber.

16. The plant of claim 14 wherein the first and second expansion devices are configured to allow formation of at least one hydrocarbon containing recycle stream from the rich solvent, and further comprising a recycle compressor that is configured to receive and compress the recycle stream to a pressure suitable for feeding the recycle stream back to the absorber.

17. The plant of claim 16 further comprising a JT valve that is coupled to the recycle compressor and configured to expand the compressed recycle stream to thereby provide refrigeration to the compressed recycle stream.

18. The plant of claim 16 further comprising a vacuum stripper that is configured to strip the solvent at a pressure of about 1 psia to about 10 psia to thereby produce a lean solvent.

19. The plant of claim 14 wherein the gas source is configured to provide the natural gas at a pressure of at least about 1000 psig, and further comprising a membrane separator that is coupled to the gas source and configured to allow removal of at least a portion of the acid gas in the natural gas.

20. The method of claim 1 further comprising a conduit fluidly coupled to a recycle gas cooler to allow withdrawal of a hydrocarbon liquid stream as a liquid product from the recycle gas.

21. The plant of claim 14 further comprising a third expansion device that is configured to receive the rich solvent and to allow for production of at least one of work and refrigeration for a carbon dioxide product.

* * * * *